Oct. 19, 1948. C. A. EVANS 2,451,934
METHOD FOR MOLDING HOLLOW OBJECTS
Filed March 15, 1946
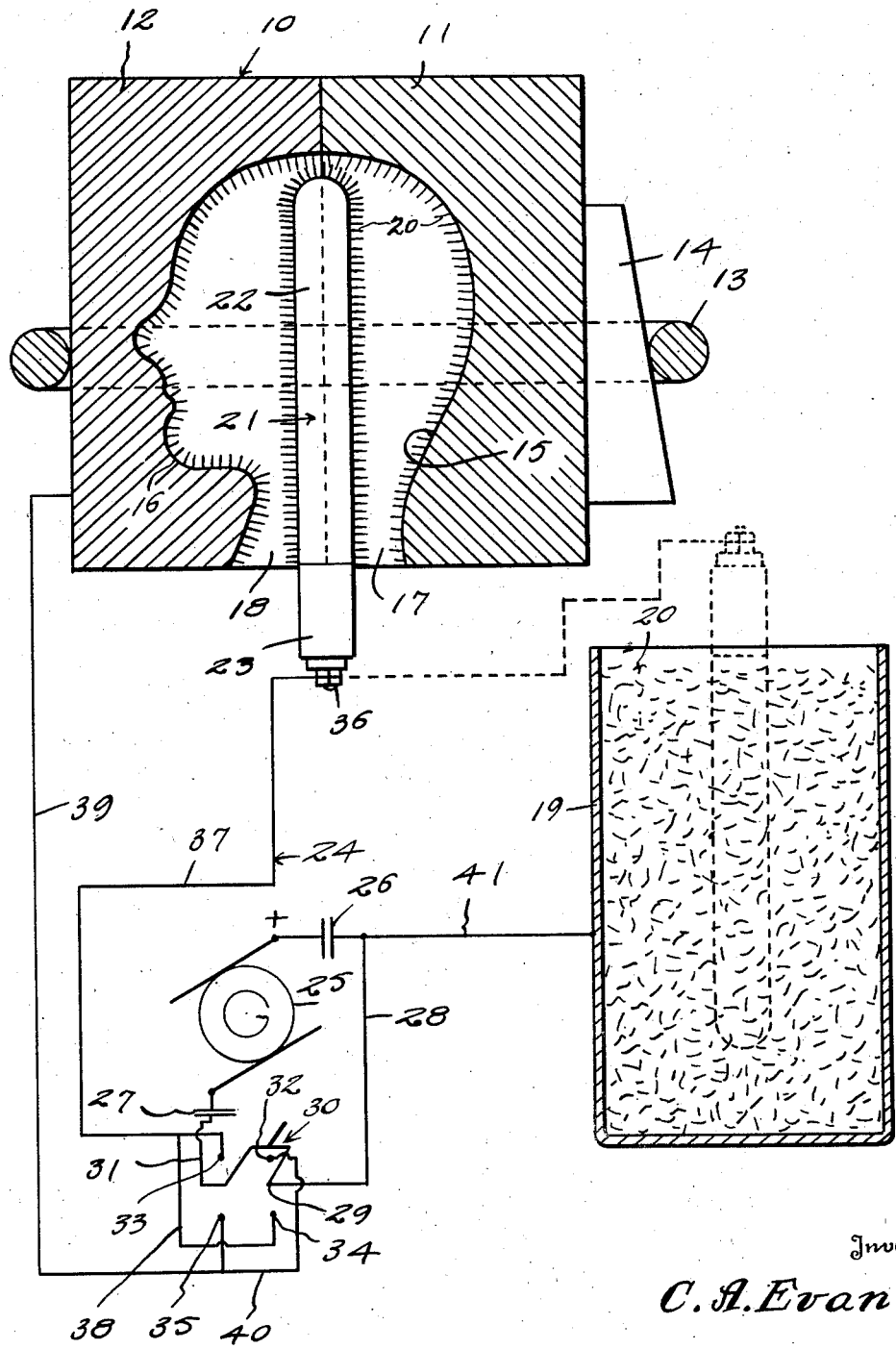
Inventor
C. A. Evans
By Kimmel & Crowell Attorneys Patented Oct. 19, 1948

2,451,934

UNITED STATES PATENT OFFICE 2,451,934

METHOD FOR MOLDING HOLLOW OBJECTS

Clarence Augustus Evans, Atlanta, Ga.

Application March 15, 1946, Serial No. 654,695

3 Claims. (Cl. 18—58.4)

This invention relates to a method for making plastic articles.

An object of this invention is to provide an improved method of making hollow plastic articles wherein the all of the article may be made of any desired thickness or density.

Another object of this invention is to provide an improved method of making hollow plastic articles, such as for example doll heads or the like, wherein the wall of the article is formed of impregnated fibers, such as flock, the fibers being impregnated with urea-formaldehyde, phenol-formaldehyde, or like product.

A further object of this invention is to provide an improved method of making a hollow plastic article which contemplates the use of a split mold, a static electrode member insertable within the mold, and a receptacle containing impregnated fibers, the electrode being initially inserted within the receptacle and subjected to a negative static electric charge so that the fibers will adhere to the electrode whereupon the electrode is inserted into the mold with the latter subjected to a negative charge and the electrode subjected to a positive charge so that the fibers will flow from the electrode to the inner surface of the mold. The mold is heated to a temperature which will cause the fibers to stick together. The process of effecting adherence of the fibers to the electrode and discharge of the fibers from the electrode to the mold is repeated until a solid wall of fibers and plastic is formed within the mold. The mold is then cooled, separated and the completed article removed therefrom.

The exact configuration illustrated is regarded as the optimum, but some of the desirable results inherent in this disclosure may be obtained by various slight modifications including some departure from the exact configuration shown, and it is, therefore, requested that the scope of the invention should be regarded as limited only by the terms of the claims.

In the drawing, the figure shows partly in section and partly diagrammatically the means constructed according to an embodiment of this invention for molding plastic and fiberized articles.

Referring to the drawing, the numeral 10 designates generally a mold which is formed of halves 11 and 12. The exterior shape of the mold may be any desired configuration, such as polygonal, round or the like. The half sections 11 and 12 forming the mold are detachably secured together by means of a clamping ring 13 which is held in clamping position by means of a wedge 14 or the like.

The interior of the mold is formed with a cavity which is positioned partly in section 11, as indicated by the numeral 15, and also partly in section 12 as indicated by the numeral 16. The cavities 15 and 16 confront each other, and open outwardly through one end of the mold as indicated by the numerals 17 and 18, respectively.

The mold 10 is preferably formed of metal, and a metal receptacle 19 having an open top is positioned adjacent the mold 10. The receptacle 19 is adapted to have positioned therein fibers or flock, designated by the numeral 20, and the fibers or flock are impregnated with a plastic material, such as urea-formaldehyde, or phenol-formaldehyde.

A static electrode 21, including an electrode body 22 and an insulating handle 23 is connected to a static electric circuit by means of a conductor, the circuit being generally designated by the numeral 24. The static circuit 24 includes a static generator 25 of conventional construction having connected thereto a pair of condensers 26 and 27. The positive side of the generator 25 is connected by means of a conductor 28 to one side 29 of a double pole double throw switch 30. The negative side of the generator 25 is connected to another side of the switch 30 by means of a conductor 31. The switch 30 includes a pair of contacts 32 and 33, and a second pair of contacts 34 and 35. The terminal 36 of the electrode 21 is connected by means of a conductor 37 to contact 33, and a second conductor 38 is connected between conductor 37 and contact 34. A conductor 39 is connected at one end to mold 10, and at the other end to contact 35. A conductor 40 is connected between conductor 39 and contact 32. A conductor 41 is connected between conductor 28 and receptacle 19. The switch 30 provides a means whereby the potential of electrode 21 may be reversed after being immersed in the fibers or flock 20 in receptacle 19, so that when the electrode 21 is positioned within the mold 10, the adhered fibers or flock will fly against the inner surface of the mold and adhere thereto and become amalgamated by the heat of the mold.

In carrying out the method of molding the articles, the impregnated fibers or flock are placed in receptacle 19, and a negative potential is placed on electrode 21 by throwing switch 30 to engage contacts 34 and 35. Electrode 21 is then withdrawn from receptacle 19 with the fibers adhering thereto and is inserted into the cavity of mold 10. Switch 30 is then reversed to engage contacts 32 and 33, thereby reversing the potential of electrode 21. Prior to the initial insertion of electrode into mold 10, the mold is heated to a degree sufficient to effect amalgamation of the fibers together through melting of the impregnated plastic. The temperature of the mold may be 230° F. or above. The insertion of the electrode 21 into the cavity of the mold is repeated as often as is considered necessary to produce the desired thickness of the wall of the article.

After the wall of the article has been completed, the mold is allowed to cool, whereupon the mold sections 11 and 12 are separated. In most instances it is not necessary to provide a coating of the mold cavity to effect separation of the article from the mold cavity, but in the event the plastic should tend to stick to the mold, the surface of the cavity may be coated with wax or other suitable coating which will permit quick separation of the article from the mold.

With a construction as hereinbefore described it is not necessary to provide an inner form for the article, and in this manner the article will be free from seams usually caused by the joint or joints of the mold sections.

I claim:

1. The process for forming hollow plastic articles of organic material in a sectional mold which comprises depositing said material on a statically charged electrode, inserting said electrode within the cavity of said mold, reversing the polarity of the charge on the electrode and charging the mold with a polarity opposite from said electrode whereby said material is deposited on the walls of the cavity of the mold.

2. The process for forming hollow plastic articles from resin impregnated fibres in a heated mold which comprises depositing said fibres on a statically charged electrode, inserting said electrode within the cavity of said mold, reversing the polarity of said electrode and charging the mold with a polarity opposite from said electrode whereby said fibres are deposited on the walls of the cavity of the mold.

3. The process for forming hollow plastic articles from resin impregnated fibres in a heated mold which comprises charging an electrode with a negative polarity, charging the mold with a positive polarity, inserting said electrode in a mass of fibres for depositing the fibres thereon, inserting said electrode into the positively charged mold, and reversing the polarity of the electrode and the mold for depositing the fibres on the walls of the cavity of the mold.

CLARENCE AUGUSTUS EVANS.

REFERENCES CITED

The following references are of record in the file of this patent:

UNITED STATES PATENTS

| Number | Name | Date |
|---|---|---|
| 1,549,875 | Horne | Aug. 18, 1925 |
| 1,698,845 | Gustin | Jan. 15, 1929 |
| 2,128,327 | Russell et al. | Aug. 30, 1938 |
| 2,376,922 | King | May 29, 1945 |